United States Patent [19]

Dunham

[11] Patent Number: 4,805,497
[45] Date of Patent: Feb. 21, 1989

[54] EXTERNALLY INDEXABLE TURRET-LIKE DEVICE FOR CUTTING MACHINES

[75] Inventor: Russell H. Dunham, New Fairfield, Conn.

[73] Assignee: The Dunham Tool Co., Inc., New Fairfield, Conn.

[21] Appl. No.: 185,237

[22] Filed: Apr. 18, 1988

Related U.S. Application Data

[63] Continuation of Ser. No. 927,241, Nov. 4, 1986, abandoned.

[51] Int. Cl.$^4$ .................................... B23B 29/00
[52] U.S. Cl. ........................ 82/36 A; 408/35; 29/48.5 R; 74/817
[58] Field of Search ............... 82/36 A; 408/35; 29/48.5 R, 48.5 A, 39, 40, 49, 36; 74/813 R, 813 L, 826, 816, 817

[56] References Cited

U.S. PATENT DOCUMENTS

| | | | |
|---|---|---|---|
| 626,208 | 5/1899 | Lucke | 29/48.5 R |
| 790,312 | 5/1905 | Potter et al. | 29/48.5 R |
| 921,984 | 5/1909 | Hanson | 29/39 |
| 2,631,481 | 3/1953 | Lee | 74/817 |
| 3,288,005 | 11/1966 | Tringale et al. | 82/36 A |
| 3,943,802 | 3/1976 | Luebkemann et al. | 82/36 A |
| 3,955,257 | 5/1976 | Herbst et al. | 82/36 A |
| 4,024,777 | 5/1977 | Fogarty | 408/35 |
| 4,051,750 | 10/1977 | Berly | 82/36 A |
| 4,541,165 | 9/1985 | Sawai et al. | 82/36 A |

FOREIGN PATENT DOCUMENTS

| | | | |
|---|---|---|---|
| 47105 | 3/1984 | Japan | 82/36 A |
| 749576 | 7/1980 | U.S.S.R. | 82/36 A |

Primary Examiner—Kurt Rowan
Attorney, Agent, or Firm—Schweitzer & Cornman

[57] ABSTRACT

An externally indexable turret-like device is provided, for use particularly with a lathe, screw machine, automatic machining center or the like, in which the indexable turret-like device cooperates with an external index member mounted on the machine to effect tool-indexing movements. In a principal illustrated embodiment, the index member is fixed to the headstock of the turning machine. The indexable turret is mounted on the tool-holding slide, which is movable by numerically controlled motors or the like. When indexing is desired, the tool support is moved to and into pressure contact with the fixed index member, which mechanically actuates the device through one index position. The device is then returned, by means of the programmed numerical control arrangement, to a cutting position. The new device may constitute a simplified form of turret, or (more typically) it may be mounted in one of the cutting tool positions on a conventional turret device of a turret lathe, for example, or it may be used as one of the exchangeable tools in an automatic machining center. In all cases, it greatly increases the tool selection or utilization capacity of the equipment at an extremely modest expense. conventional turret 1 Claim, 3 Drawing Sheets

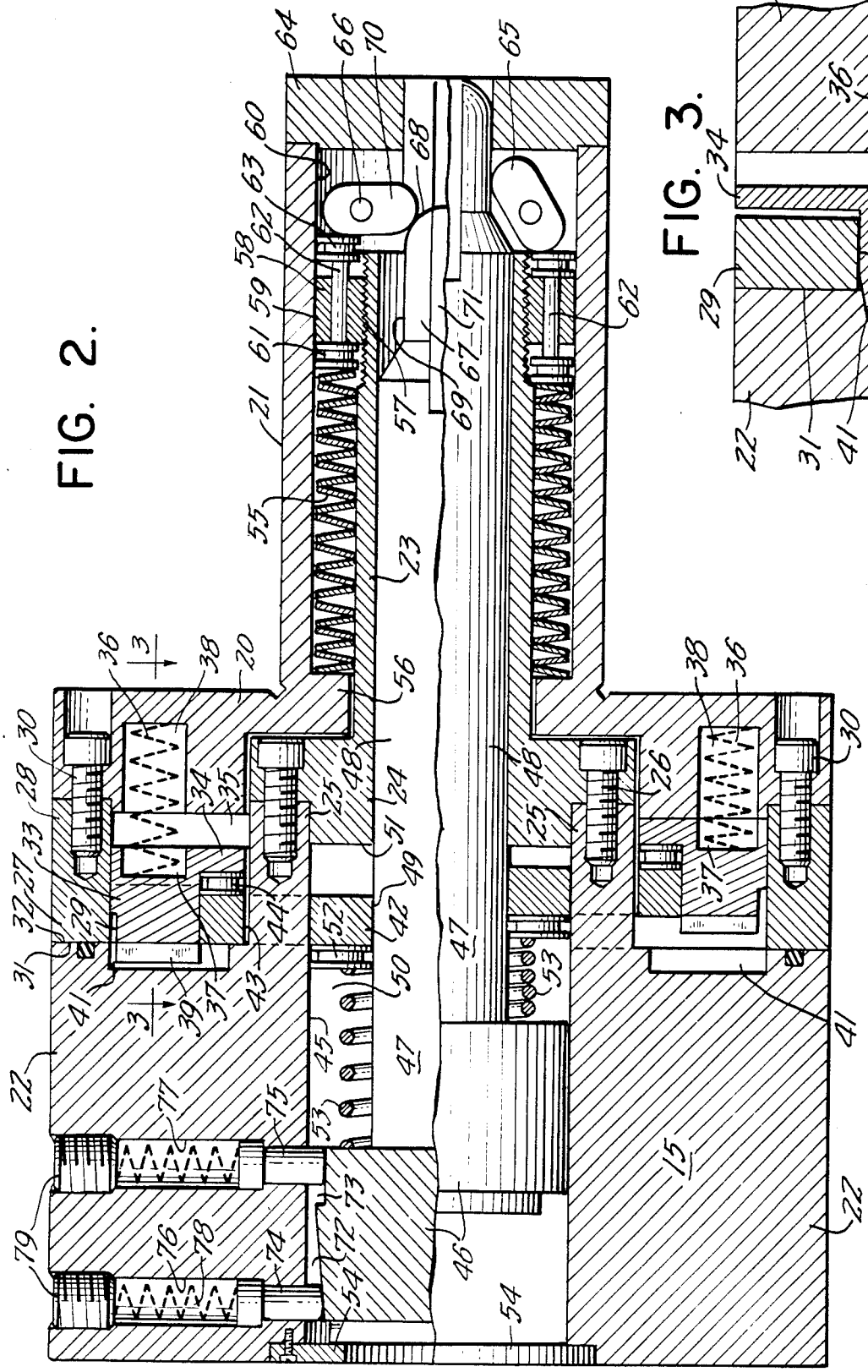
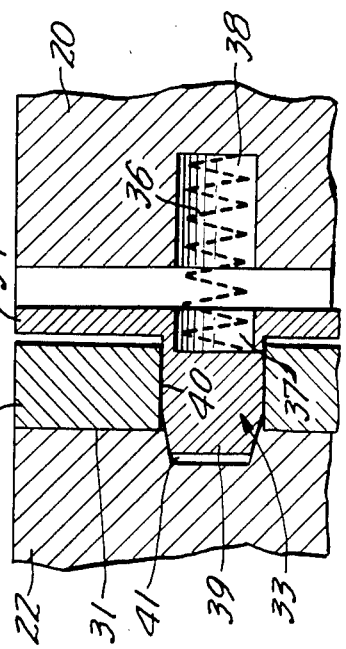
FIG. 2.
FIG. 3.

TOTAL MOVEMENT OF PLUNGER

EXTERNALLY INDEXABLE TURRET-LIKE DEVICE FOR CUTTING MACHINES

This application is a file wrapper continuation of application Ser. No. 069,272 abandoned into this application Apr. 18, 1988.

BACKGROUND AND SUMMARY OF THE INVENTION

A variety of modern machine tools, such as lathes, screw machines, automatic machining centers, etc. employ indexable turret devices for presenting a succession of cutting tools to the work piece for the performance of various machining operations. Quite typically, a specific machined part will require a plurality of machine operations to be performed in succession, such as sizing, threading, undercutting, chamfering etc. The necessary tools for each of these operations are mounted in the several index positions of a turret and presented to the work piece in the desired succession by periodic indexing of the turret.

Conventional indexable turret devices are normally self-actuated, typically by dedicated hydraulic or electrical mechanisms, such that the indexable turret mechanism as a whole is customarily a complex and costly element of machine tool.

In accordance with the present invention, a novel indexable turretlike device is provided, which is passive in nature and is indexed by external means. To greatest advantage, the mechanical motions necessary to effect indexing are derived from movements of the tool holding slide, which are already available on the machine for the normal manipulation of cutting tools and which can be easily controlled to perform the motions necessary for indexing by conventional numerical control facilities, for example.

In a particularly simplified form of the invention, a fixed plunger-like indexing element is mounted on the headstock, ram or other tool supporting element of the machine. When it is desired to effect an indexing movement, the indexable device is manipulated by programmed movements of the N/C controlled tool support, to move the indexable devices toward and into contact with the indexing element. An indexing plunger, mounted in the turret device, is depressed by the fixed indexing element and executes the necessary mechanical movements to index the turret-like device through one position.

Although the indexable turret-like device of the invention may be used as the principal turret in a simplified machine tool, it may also be used to special advantage when mounted in an individual tool position of a primary, self-actuated turret in an otherwise conventional machine or as an exchangeable tool element in an automatic machining center. By way of example only, if one of several tools, for a multi-tool machining operation, is subject to a much greater rate of wear and replacement than the others, it is possible to mount a plurality of such cutting tools on an externally actuated turret-like device according to the invention, which device is mounted in an individual tool position on a conventional turret. This permits rapidly worn cutting tools to be renewed by merely indexing the passive turret-like device, without stopping the equipment for changing of tools and without limiting the usefullness of the main turret by utilizing more than one of its primary tool positions for duplicates of the same wearable tool.

It will be understood, in this respect, that the inherent complexity and cost of a self-actuating turret arrangement would virtually preclude the use of such a turret as an auxiliary device in one of the tool positions of a conventional primary turret device or as a single tool for an automatic machining center. The externally actuated, passive turret device of the invention, on the other hand, is sufficiently small and compact that it can be carried in an individual tool position on a conventional turret or tool changer carrousel. It of course requires no dedicated electrical, hydraulic or other internal mechanical connections, and thus does not require major redesign and reconstruction of the principal turret, as would be the case if the secondary turret were internally actuated.

For a more complete understanding of the above and other features and advantages of the invention, reference should be made to the following detailed description of a preferred embodiment of the invention and to the accompanying drawings.

DESCRIPTION OF THE DRAWING

FIG. 2 is a longitudinal cross sectional view of the turret-like device of the invention.

FIG. 3 is an enlarged, fragmentary cross sectional view as taken on line 3—3 of FIG. 2.

DESCRIPTION OF ONE PREFERRED EMBODIMENT OF THE INVENTION

Figure 1:
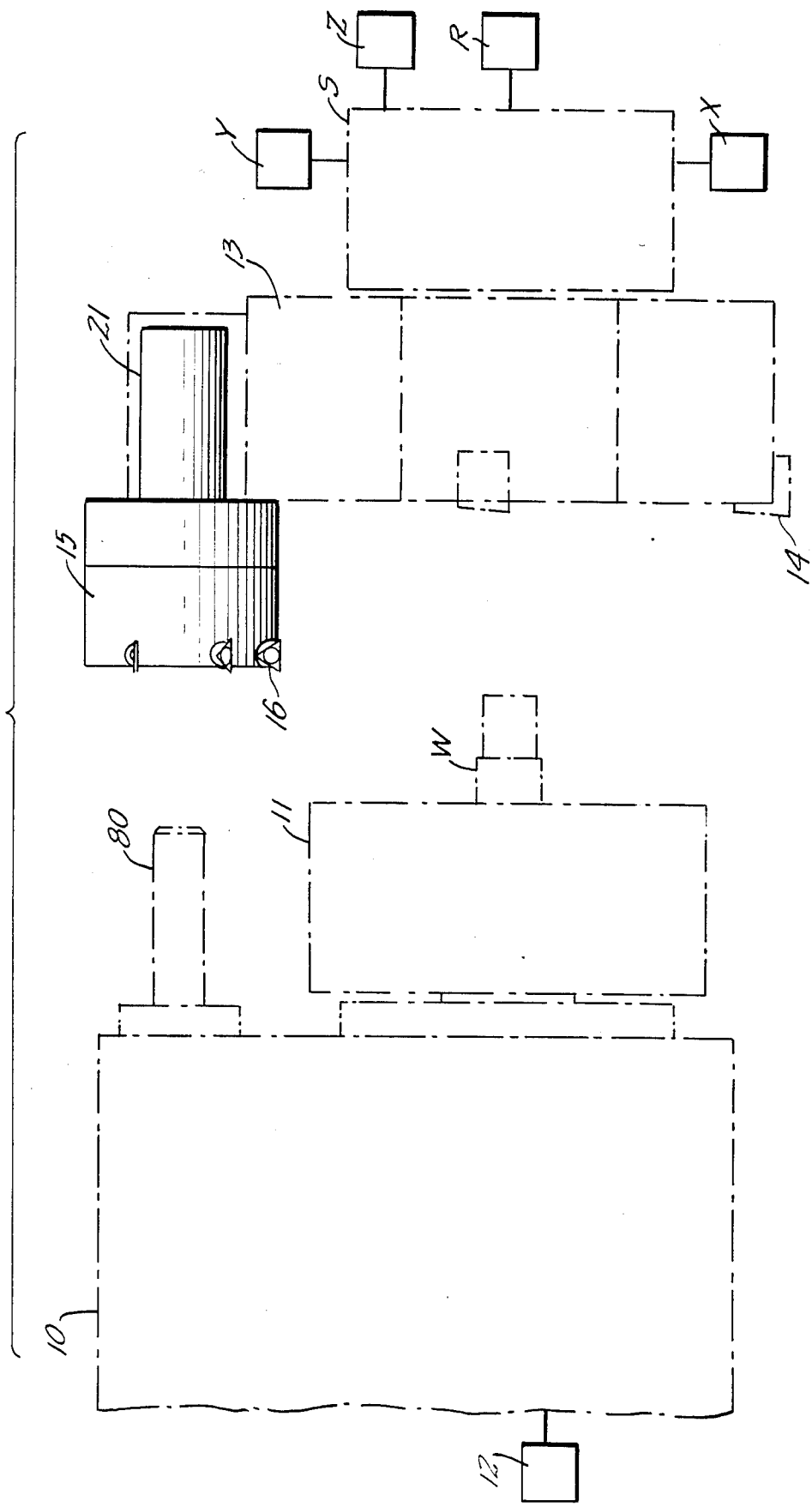
FIG. 1 is a simplified illustration of a turret lathe, otherwise of conventional design, incorporating the new indexable turret-like device of the invention.

Referring now to the drawings, the reference numeral 10 designates generally the headstock of a typical turret lathe. The lathe is conventionally provided with a work holding chuck 11, which is controllably rotated by the lathe drive 12. The chuck rotatably mounts a workpiece W while machining operations are performed thereon by means of manipulatable but otherwise generally stationary cutting tools.

Mounted on the frame structure of the lathe is a turret head 13, which may be of any conventional construction and is provided with a plurality of work stations, normally six or eight. Typically, each station mounts a cutting tool 14, although in the installation of the present invention, one or more of the working stations of the turret 13 mounts an indexable auxiliary turret-like device 15, which itself is provided with a plurality of work stations, each mounting a cutting tool 16.

In accordance with well known principles, the primary turret 13 is mounted on a tool slide mechanism S, which enables the turret 13 to be controllably moved by motors X, Y and Z along any of three axes, i.e., horizontally, parallel to the axis of the chuck 11 or at right angles thereto, or vertically. The turret is also, of course, rotatably indexable by a drive means R to bring any one of the several turret stations into the proper orientation for acting on the workpiece W. Most typically, contemporary turret lathes and similar cutting machines are controlled by numerical control systems or equivalents, whereby the movements of the cutting tools along any of the three axes are automatically controlled, according to a predetermined program. The invention is most ideally suited for equipment utilizing such automatic controls. However, the principles of the invention are applicable to manually controlled equipment as well.

In the illustrated form of the invention, one of the work stations of the primary turret 13 is occupied by the indexable turret-like device of the invention, one of the tools which is in a cutting position with respect to the workpiece W, when that station of the primary turret is indexed to the working position. Except during indexing operations, the secondary turret device 15 functions substantially as a normal cutting tool on the primary turret 13.

Referring now to FIG. 2 of the drawing, the indexable device 15 includes a main body member 20 from which extends a tubular shank 21 adapted to be mounted on the primary lathe turret 13. The shank 21 and body 20 are securely fixed to the main turret, so as to be nonmovable relative thereto.

A rotatably indexable tool-supporting head 22 is mounted at the front of the main body 20, being supported thereon by a tubular shaft 23 having a mounting flange 24 at its front end. On its rearwardly facing surface, the indexing head 22 is provided with a plurality of spaced apart support fingers 25, which project axially toward and into contact with the mounting flange 24. The individual fingers 25 are secured to the flange by means of a plurality of bolts 26, such that the indexing head 22 is rigidly secured to its support shaft 23, while being spaced somewhat forward of the mounting flange 24 by means of the rearwardly projecting fingers 25.

As will be described in further detail, the body member 20 and shank 21 are intended to remain fixed to the primary turret 13. The indexing head 22, on the other hand, is intended to be rotatably indexable relative to the main body member, in order to present anyone of several cutting tools, mounted by the indexing head, into the cutting position.

Figure 4:
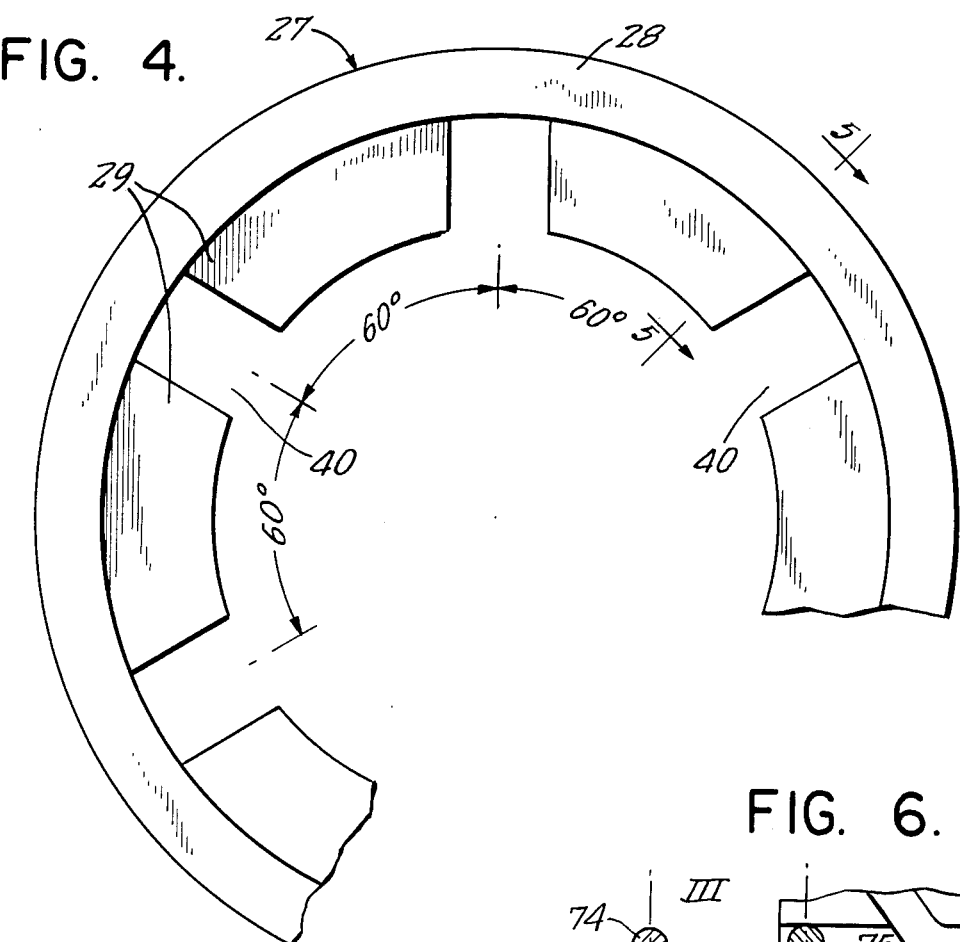
FIG. 4 is a fragmentary back elevational view of a support ring, forming part of the device of FIG. 2.
Figure 5:
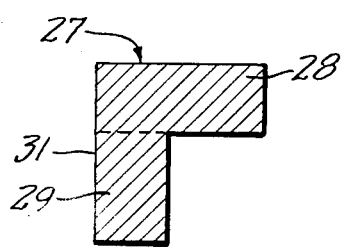
FIG. 5 is a fragmentary cross sectional view taken on line 5—5 of FIG. 4.

Rigidly mounted on the main body member 20 is a support ring 27 which includes an annular mounting flange 28 and a radially inwardly projecting slotted positioning flange 29 (see FIG. 4). The annular mounting flange is secured by a plurality of bolts 30 to the body member 20 and forms in effect a forward extension thereof. The front facing surface 31 of the support ring 27 is positioned to abut directly against a generally complementary rearwardly facing surface 32 of the index head 22, especially about the outer periphery of the elements, in order to provide a rigid support for the index head 22 during cutting operations. The device includes high power spring means, to be described, to urge the index head 22 tightly against the support ring 27 during such operations.

Positive index positioning of the index head 22 is provided by means of a retractable positioning ring 33, which cooperates with the support ring 27. The retractable positioning ring includes an annular flange 34, the inside and outside diameters of which are such as to fit closely within the rearwardly projecting flange 28 of the support ring and to closely surround the plurality of spacing fingers 25. The thickness of the flange 34, measured along the axis of the indexing tool, is substantially less than the axial width of the space 35, formed between the front face of the body member 20 and the rear face of the slotted flange 29, in order to accommodate a predetermined axial motion of the retractable index positioning ring 33. A plurality of circumferentially spaced springs 36 are received in appropriate sets of recesses 37, 38, provided in the movable positioning ring and body member respectively, and these springs serve to urge the retractable positioning rings at all times in a forward direction. As shown particularly in FIGS. 2 and 3, the movable positioning ring 33 is provided with a plurality of spaced index positioning lugs 39, which are received closely and slideably within radial slots 40 formed in the positioning flange 29 of the support ring 27. The forward end extremities of these indexing lugs are slightly tapered and, in the forwardmost position of the positioning ring 33, project foward of the front surface 31 and into correspondingly tapered index recesses 41 in the index head 22. The recesses 41 in the illustrated device are radially disposed milled slots, which are positioned according to the number of index positions of the device. Typically, the device may have six index positions, in which case the index head may be provided with six of the radial index slots 41 and also typically six of the index positioning lugs 39.

As is reflected in FIG. 3, the tapered lugs 39 desirably engage the sides of the tapered slots 41, before bottoming out in the slots, in order to assure a tight positioning engagement between the lugs and the slots.

In order to retract the retractable positioning ring 33, when it is desired to index the device, the device of the invention includes an annular transfer plate 42, which is provided with a plurality of openings 43 for the slideable reception of the spacing fingers 25. Adjacent its outer extremities, the rearwardly facing surface of the transfer plate bears against an annular thrust washer 44, which also bears against the forwardly facing surface of the flange 34, projecting inward from the retractable positioning ring 33.

As reflected particularly in FIG. 2, the indexing head 22 is provided with a central recess 45 of relatively large diameter in which is slideably received the enlarged head portion 46 of an axially displaceable actuating plunger 47. The actuating plunger 47 includes a rearwardly extending, elongated shaft portion 48, which extends through the center of the indexing support shaft 23, in close fitting relation. The shaft portion 48 of the actuating plunger is closely received in the center opening 49 of the transfer plate 42.

The axial depth of the central recess 45 is substantially greater than the length of the plunger head 46, such that an elongated annular chamber 50 is defined between the plunger head 46 and the front facing surface area 51 of the body member 20. A second annular thrust washer 52 is received in this annular chamber 50, bearing against the front face of the transfer plate 42. A relatively strong coil spring 53 is maintained in compression between the plunger head 46 and the thrust washer 52 as illustrated. In the normal, forward position of the actuating plunger 47, seated against a retaining ring 54, the spring 53 is under minimal compression, such that the retractable positioning ring 33 is displaced forwardly by the several springs 36, into its index-locking position, with the various lugs 39 projected into the corresponding radial index slots 41. When the plunger 47 is displaced rearwardly (to the right in FIG. 2) through a sufficient distance, the compression forces of the spring 53, acting through the thrust washer 52, transfer plate 42 and the thrust washer 44, press rearwardly on the retractable index positioning ring 33, overcoming the combined forces of the several springs 36 and retracting the positioning ring to withdraw the lugs 39 from their respective index slots 41 in order to free the index head 22 for rotary indexing movement.

To particular advantage, the indexing head 22 is held tightly against, and thus rigidly supported by the support ring 27, for cutting operations. To accommodate indexing movements, it is desirable that these strong holding forces be relieved, at least partially, to facilitate the indexing motions. To this end, a Bellville spring structure 55 is received within an elongated annular recess formed between the mounting shank 21 and the index supporting shaft 23. Near the forward end of the shank 21 there is formed a bearing shoulder 56, which closely surrounds the shaft 23 and forms a front bearing. The rearward extremity of the shaft 23 is threaded at 57 to receive a threaded bearing collar 58. The outer surfaces 59 of the bearing collar engage the inner walls 60 of the hollow shank 21, to provide a rear bearing for the shaft 23, spaced substantially from the front bearing 56. A thrust washer 61 is interposed between the front face of the bearing collar 58 and the rearward face of the Bellville spring stack 55 to accommodate relative rotational movement of the collar with respect to the spring stack. Under normal conditions, the bearing collar 58 is adjustably positioned on the threaded shaft section 57 to the point where there is significant rearward pressure on the bearing collar from the Bellville spring stack, maintaining the outer periphery of the index head 22 tightly against and thus firmly engaged by the support ring 27.

Since the rearward force of the Bellville springs 55 would cause significant frictional resistance to indexing movements of the index head 22, means preferably are provided for relieving some or all of the spring pressure during such indexing movements. In the device of the invention, this is accomplished by means of a plurality of displacement pins 62 which extend axially through the bearing collar 58 at a plurality of spaced points and are arranged to bear against the thrust washer 61. The displacement pins are slightly longer than the axial length of the bearing collar, so as to project rearwardly thereof, where they engage a second thrust washer 63.

An end cap 64 is bolted or otherwise secured to the open end of the hollow mounting shank 21 and carries a plurality of cam levers 65 mounted on pivot shafts 66. The configuration of the cam levers is such that, when the rear thrust washer 63 is in its normal, rearwardly displaced position, the cam levers are held in a generally radially disposed orientation, with free ends thereof projecting radially inward toward the center of the shank 21.

In the illustration of FIG. 2, the upper half shows the plunger 47 in its normal position, while the lower half shows the plunger displaced to its actuated position. The rearward end extemity of the actuating plunger 47 is provided with a cam section 67 including a rounded or tapered nose 68 and a lift portion 69 of generally uniform diameter. When the actuating plunger 47 is displaced rearwardly, the nose portion 68 engages the radially inward end extremities 70 of the cam levers 65, pivoting the cam levers outward and rearward until, upon sufficient rearward movement of the plunger, the cam levers ride along the lift portion 69 without further displacement. The initial rotational displacement of the cam levers about their respective pivot shafts 66 serves to displace forwardly the thrust washer 63. This in turn depresses the displacement pins 62, causing forward displacement of the thrust washer 61 on the front side of the bearing collar 58. When the device is in this condition, the rearward thrust of the Bellville spring stack 55 does not act upon the bearing collar 58, but rather acts through the thrust washers 61, 63, the displacement pins 62 and the cam levers 65 upon the end cap 64. The indexable components of the device are thus isolated from the force of the Bellville spring stack to accommodate relatively resistance free indexing movement of the indexing head 22. As soon as the actuating plunger 47 is retracted, the force of the Bellville spring is reapplied to the bearing collar 58 to urge the indexing head 22 tightly against its supporting ring 27.

To advantage, the rotary indexing movements of the index head 22 are brought about by the axial movement of the actuating plunger 47. To this end, the indexing head 22 and the plunger 47 are provided with cooperating cam and cam follower means such that, when the actuating plunger 47 is depressed without rotation, the indexing head 22 is caused to rotate through one index position, typically 60 degrees. For this purpose, the actuating plunger may be provided at its rearward end with a key 71 receivable in an appropriate slot (not shown) in the end cap 64 such that sliding, but not rotary motion of the actuating plunger is accommodated.

Figure 6:
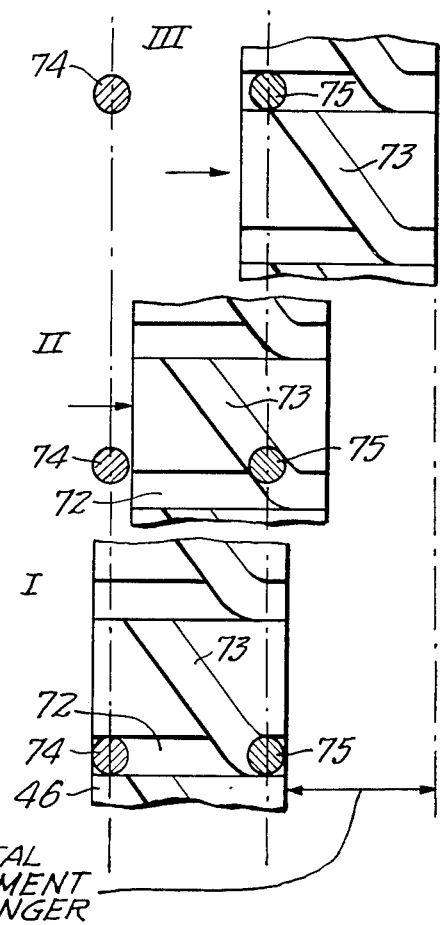
FIG. 6 is a fragmentary developed view of a cam arrangement for indexing the turret-like device.

In the illustrated arrangement, the enlarged head portion 46 of the plunger is provided with a plurality of pairs of cam slots 72, 73 arranged to cooperate with cam follower pins 74, 75 carried in the index head 22. The cam follower pins may be in the form of small plungers, received in shouldered recesses 76, 77 in the index head and pressed downwardly by springs 78 compressed by set screws 79. The forward cam follower pin 74 serves principally as a positioning device, and it is received in the forward extremity of a longitudinally disposed cam slot 72, when the actuating plunger 47 is in its forwardmost or normal position. The primary cam follower pin 75 normally rests at the inner extremity of a curved cam track 73, and is typically arranged in substantially direct axial alignment with the positioning pin 74, as reflected in the developed view of FIG. 6, for example. Both of the cam slots 72, 73 are inclined slightly, with the straight, longitudinally disposed cam slot 72 being somewhat deeper at its forward end than at its rearward end, and the curved cam slot 73 being somewhat deeper at its rearward end than at its forward end.

When an indexing operation is commenced, by inward displacement of the actuating plunger 47, the positioning pin 74 is immediately withdrawn from the cam slot 72, while the principal cam follower pin 75 begins to track the curved cam slot 73. Because the curved cam slot 73 is somewhat deeper than the straight cam slot 72, where the two slots join, the cam follower pin 75 is forced to follow the curved slot. Since the actuating plunger 47 is non-rotatably secured, this action causes rotary indexing motion of the indexing head 22. When the actuating plunger 47 reaches its maximum displacement position, the indexing head 22 will have been displaced a full index position, and the cam follower pin 75 will have entered the forward end portion of the next adjacent longitudinal cam longitudinal slot 72. Because of the respective opposed inclined relations of the slots 72, 73, the cam follower pin 75 will drop down into the next cam slot 72. Thereafter, when the plunger 47 is released and allowed to return to its normal position, the cam follower 75 will be confined to the longitudinal track 72. Upon full retraction of the plunger 47, the positioning pin 74 enters the front end of the track 72, so that the indexing head 22 is locked in its rotationally displaced position.

As the actuating plunger 47 retracts to its forward limit position, the cam levers 65 are released, enabling the Bellville spring stack 55 to again act upon the bearing collar 58, providing a rigid support for the index head against the supporting ring 27. Likewise, as the actuating plunger 47 returns to its normal position, the spring 53 releases its pressure on the transfer plate 42, allowing the retractable positioning ring 33 to return to its forward position, with its lugs 39 projected into the indexing slots 41 for the next index position of the indexing head 22.

Thus, the actuating plunger 47 desirably performs three operations during the course of a full stroke of depression of the plunger. Initially, the indexing head 22 is released by, in sequence, relieving the pressure on the Bellville spring stack 55 and withdrawing the indexing lugs 39 from the index slots 41. Thereafter, the indexing head 22 is progressively rotated through one index position, by the coaction of the cam follower pin 75 and the curved cam slot 73. When the actuating plunger subsequently is retracted, the positioning lugs 39 are caused to be projected into the next set of indexing slots 41, after which the Bellville springs 55 are released to cause the index head 22 to be pressed tightly against the support ring. And, finally, the positioning pin 74 enters the forward end of the appropriate cam slot 72.

While almost any means may be employed to depress the actuating plunger 47 and effect indexing movements of the index head 22, the most advantageous mode of the invention contemplates that the necessary motions for index actuation will be carried out by programmed movements of the tool slide S, in conjunction with a stationary indexing rod 80 (FIG. 1). The indexing rod may be mounted on the headstock 10 of the machine, offset to one side of the chuck 11. When it is desired to index the auxiliary turret 15, the tool slide S is operated under the control of the actuators X, Y and Z, to bring the indexable turret device into axial alignment with the indexing rod 80. The X positioning motor is then actuated to advance the tool slide to the left, bringing the actuating plunger 47 into contact with the indexing rod 80 and, with continued movement, causing the plunger 47 to be depressed, and then released, to bring about a single indexing of the auxiliary turret. If, for some reason, multiple indexing movements are required, the tool slide S may be reciprocated, each time bringing about a further indexing rotation of the index head 22. When the desired new tool is in a cutting position, the tool slide positioning motors X, Y and Z are actuated to return the tool slide to a predetermined working position relative to the workpiece W.

It would be quite possible, of course, to provide separate actuating means to bring the indexing rod 80 to the actuating plunger 47 for effecting actuating motions. However, it is generally preferred to utilize the existing tool slide positioning motors, as that requires merely the insertion of a predetermined programming sequence, without the addition of further motors and actuators.

The apparatus of the invention can be used in a variety of ways to increase the flexibility and usefulness of a lathe or other cutting machine equipped with a conventional tool-holding device. Whereas a typical lathe turret for example, may have six or eight tool-holding positions, the apparatus of the invention makes it possible to substitute, in one or more of those tool holding positions, an auxiliary indexable device which itself may mount a plurality—typically six—cutting tools. With the use of a single indexable turret-like device according to the invention, a conventional turret may be expanded from a six tool device to an eleven tool device.

The advantages of the invention are realized by providing for external indexing actuation of the auxiliary indexing device. Thus, whereas a conventional turret has a relatively complex internal structure in the first instance, because of its self-contained indexing mechanisms, the provision of self-contained indexing for an auxiliary turret device, mounted in one of the tool positions of the main turret, would be inordinately complex and expensive. With the apparatus of the present invention, however, the indexable auxiliary turret-like device involves little more complexity than is required for the mounting of a conventional cutting tool, and readily programable tool slide motions are relied upon to effect the necessary auxiliary turret indexing operations.

While the invention is by no means limited to such an application, it can be particularly useful for cutting operations in which one or more of the cutting tools are subjected to a relatively higher rate of wear than others of the tools. In such a case, multiples of the shorter lived tools may be mounted on an auxiliary turret-like device, and these may be renewed from time to time, as necessary, by simply indexing the auxiliary turret-like device and without preempting any of the valuable tool positions of the principal turret 13.

Although the device of the invention has been described principally in conjunction with a conventional turret lathe, it has broad application to all types of machining operations, particularly those involving so-called single-point cutting tools. For example, in an automatic machining center, the indexable device may be used as one of the tools in the tool-holding carrousel or similar tool inventory device. When the indexable tool mounting device of the invention is picked up from the carrousel and mounted in the tool slide, it may be independently indexed by programmed tool slide movements, for example. The effect is to greatly expand the effective capacity of the otherwise conventional tool changing equipment.

It should be understood of course that the specific form of the invention herein illustrated and described is intended to be representative only, as certain changes may be made therein without departing from the clear teachings of the disclosure. By way of example only, the indexing mechanism need not be actuatable only from the front of the device. Other mechanisms, acting radially, or from the rear, or otherwise, can be employed by those skilled in the art to effect desired indexing movements of the device by contact with an external element. Accordingly, reference should be made to the following appended claims in determining the full scope of the invention.

I claim:

1. For use in combination with a multi-tool cutting machine having a primary tool holding mechanism indexable about a primary axis, an externally actuated turret-like indexable secondary tool mounting device, which comprises (a) a body member having a shank mountable on said primary tool holding mechanism in one tool holding position thereof and bodily movable upon indexing of said primary tool holding mechanism about said primary axis, (b) an index head supported on said body member for rotation about a secondary axis parallel to said first axis and having a plurality of means thereon for mounting cutting tools, (c) index positioning means cooperable with said body member and said index head for locking said index head in any one of several index positions for presenting cutting tools in a working position, (d) an externally engageable and operable plunger-like actuating member mounted in said turret-like device coaxially of said secondary axis and controllably movable along said secondary axis, (e) said actuating member being operable, when externally engaged and axially moved, first to temporarily release said index positioning means and then to incrementally rotate said index head relative to said body, (f) said actuating member having a portion exposed at the front of said index head and mechanically actuatable coaxially by a fixed external actuating element mounted on said machine tool.

* * * * *